(12) United States Patent
Karaoguz

(10) Patent No.: US 9,497,582 B2
(45) Date of Patent: Nov. 15, 2016

(54) SMART PHONE TO HOME GATEWAY/STB DATA EXCHANGE FOR CONTENT DELIVERY

(71) Applicant: BROADCOM CORPORATION, Irvine, CA (US)

(72) Inventor: Jeyhan Karaoguz, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 451 days.

(21) Appl. No.: 13/769,615

(22) Filed: Feb. 18, 2013

(65) Prior Publication Data

US 2014/0228055 A1     Aug. 14, 2014

Related U.S. Application Data

(60) Provisional application No. 61/763,094, filed on Feb. 11, 2013.

(51) Int. Cl.
*H04W 4/02*        (2009.01)

(52) U.S. Cl.
CPC ............ *H04W 4/02* (2013.01); *H04W 4/023* (2013.01)

(58) Field of Classification Search
CPC ........ H04W 4/02; H04W 4/023; G06F 3/048
USPC ..................................... 455/456.3
See application file for complete search history.

(56) References Cited

U.S. PATENT DOCUMENTS

| | | | | |
|---|---|---|---|---|
| 2002/0138830 A1* | 9/2002 | Nagaoka | ............... | H04H 60/31 725/14 |
| 2008/0220760 A1* | 9/2008 | Ullah | ................... | G06Q 30/02 455/420 |
| 2009/0298514 A1* | 12/2009 | Ullah | ........................ | G01S 5/02 455/456.5 |
| 2010/0131985 A1* | 5/2010 | Panje | ................... | H04N 21/235 725/53 |
| 2011/0014928 A1* | 1/2011 | Ruckart | ................. | G06Q 30/02 455/456.3 |
| 2011/0131623 A1* | 6/2011 | Kang | ................. | H04N 21/4126 725/110 |
| 2012/0066066 A1* | 3/2012 | Jain et al. | ................... | 705/14.58 |
| 2012/0108210 A1* | 5/2012 | Kim et al. | ..................... | 455/411 |
| 2012/0158509 A1* | 6/2012 | Zivkovic et al. | .......... | 705/14.58 |
| 2012/0323685 A1* | 12/2012 | Ullah | ......................... | 705/14.53 |
| 2013/0036434 A1* | 2/2013 | Shkedi | ............... | H04N 21/4524 725/14 |
| 2013/0060601 A1* | 3/2013 | Kodialam | .............. | G06Q 30/02 705/7.29 |
| 2014/0189733 A1* | 7/2014 | Anguiano | ............. | H04W 4/206 725/35 |
| 2014/0189734 A1* | 7/2014 | Anguiano | .......... | H04N 21/4668 725/35 |
| 2016/0073143 A1* | 3/2016 | Filev | ...................... | H04L 67/22 725/10 |

* cited by examiner

*Primary Examiner* — Nathan Mitchell
(74) *Attorney, Agent, or Firm* — Garlick & Markison; Bruce E. Garlick

(57) ABSTRACT

A home gateway/STB establishes communication with a smart phone, queries the smart phone for digital diary data, receives the digital diary data from the smart phone, communicates with a remote server to deliver at least some of the digital diary data, receives content from the remote server that is selected based upon to the digital diary data, and downloads the content to the smart phone upon determining proximity of the smart phone to the home gateway/STB. The digital diary data may be information about a transaction serviced by the smart phone, information regarding browsing activities of the smart phone, location data of the smart phone captured over time, or other data. The content may be a channel guide that is customized based upon the digital diary data, media selected based upon the digital diary data, content advertisements selected based upon the digital diary data, or a combination thereof.

20 Claims, 10 Drawing Sheets

SMART PHONE TO HOME GATEWAY/STB DATA EXCHANGE FOR CONTENT DELIVERY

CROSS REFERENCE TO RELATED APPLICATIONS

The present U.S. Utility Patent Application claims priority pursuant to 35 U.S.C. §119(e) to U.S. Provisional Application Ser. No. 61/763,094 entitled "Smart Phone to Home Gateway/STB Data Exchange for Content Delivery," filed Feb. 11, 2013, which is hereby incorporated herein by reference in its entirety and made part of the present U.S. Utility Patent Application for all purposes.

This application is related to application Ser. No. 13/534,995, filed Jun. 27, 2012, which is a continuation of application Ser. No. 12/132,323, filed Jun. 3, 2008, entitled "Method and System for a Digital Diary System," now issued as U.S. Pat. No. 8,223,799, which claims the benefit of U.S. Provisional Application Ser. No. 60/943,162, filed on Jun. 11, 2007, entitled "System And Method For A Location-Based Digital Diary," which applications are incorporated herein in their entirety by this reference.

This application also makes reference to:

U.S. application Ser. No. 11/861,224, filed Sep. 25, 2007, entitled "Method and System for Creating a Personalized Journal Based on Collecting Links to Information and Analyzing Those Links for Later Retrieval," issued as U.S. Pat. No. 8,027,668 on Sep. 27, 2011.

U.S. application Ser. No. 11/968,560, filed Jan. 2, 2008, entitled "Method and System for Utilizing Context Data Tags to Catalog Data in a Wireless System," issued as U.S. Pat. No. 8,355,706 on Jan. 15, 2013.

U.S. application Ser. No. 11/864,202, filed Sep. 28, 2007, entitled "Method and System for Tagging Data with Context Data Tags in a Wireless System," pending.

U.S. application Ser. No. 11/864,255, filed Sep. 28, 2007, entitled "Method And System For Utilizing And Modifying User Preference Information To Create Context Data Tags In A Wireless System," pending.

U.S. application Ser. No. 11/864,383, filed Sep. 28, 2007, entitled "Method and System for Utilizing Positional Information of Tagged Data When Processing Information in Wireless Devices," pending.

Each of the above-referenced applications is hereby incorporated herein by reference in its entirety.

TECHNICAL FIELD

The present application is related to wireless communications and content delivery, and more particularly to smart phones and set top boxes/media gateways.

BACKGROUND

The field of wireless communication has seen dramatic growth the last few years. In today's world, most people use their portable devices, be it cellular phones, PDA's, laptops, media players and/or other devices, for various purposes, including business and personal, on a constant and daily basis. Increasingly, people are able to access information according to their individual choice. For instance people may select music or videos from an electronic media store of their choice and play them on portable devices. In addition, the Internet allows people to access news and information at a time convenient for them rather than at specified broadcast times. In addition, many wireless solutions have been introduced, and have made tremendous strides into everyday life.

Providers of advertisements have used the Internet for many years to deliver advertisements tailored to users of computers. Major Internet search companies often couple advertisements with search results in an attempt to cause users to click upon the advertisements to purchase products and services. Coupling advertisements with search results has proven to be very lucrative for the search providers. However, other Internet sites, such as social media sites have had difficulty in determining what advertisements produce relevant click through actions.

Providers of media, such as streamed video and music, generate revenue when users watch such media and when they view advertisements included with such media. However, because media is typically streamed to a single user, the difficulty of selecting relevant advertisements to particular users is great and many advertisements are simply ignored or skipped over. Unfortunately, they can do little to push particular programming to individual users or groups of users. As technology supports the ability to service greater volumes of streamed media, these problems substantially preclude providers of advertisements and media from efficiently matching programming and advertisements with particular users.

Further limitations and disadvantages of conventional and traditional approaches will become apparent to one of skill in the art, through comparison of such systems with the present invention as set forth in the remainder of the present application with reference to the drawings.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1A:
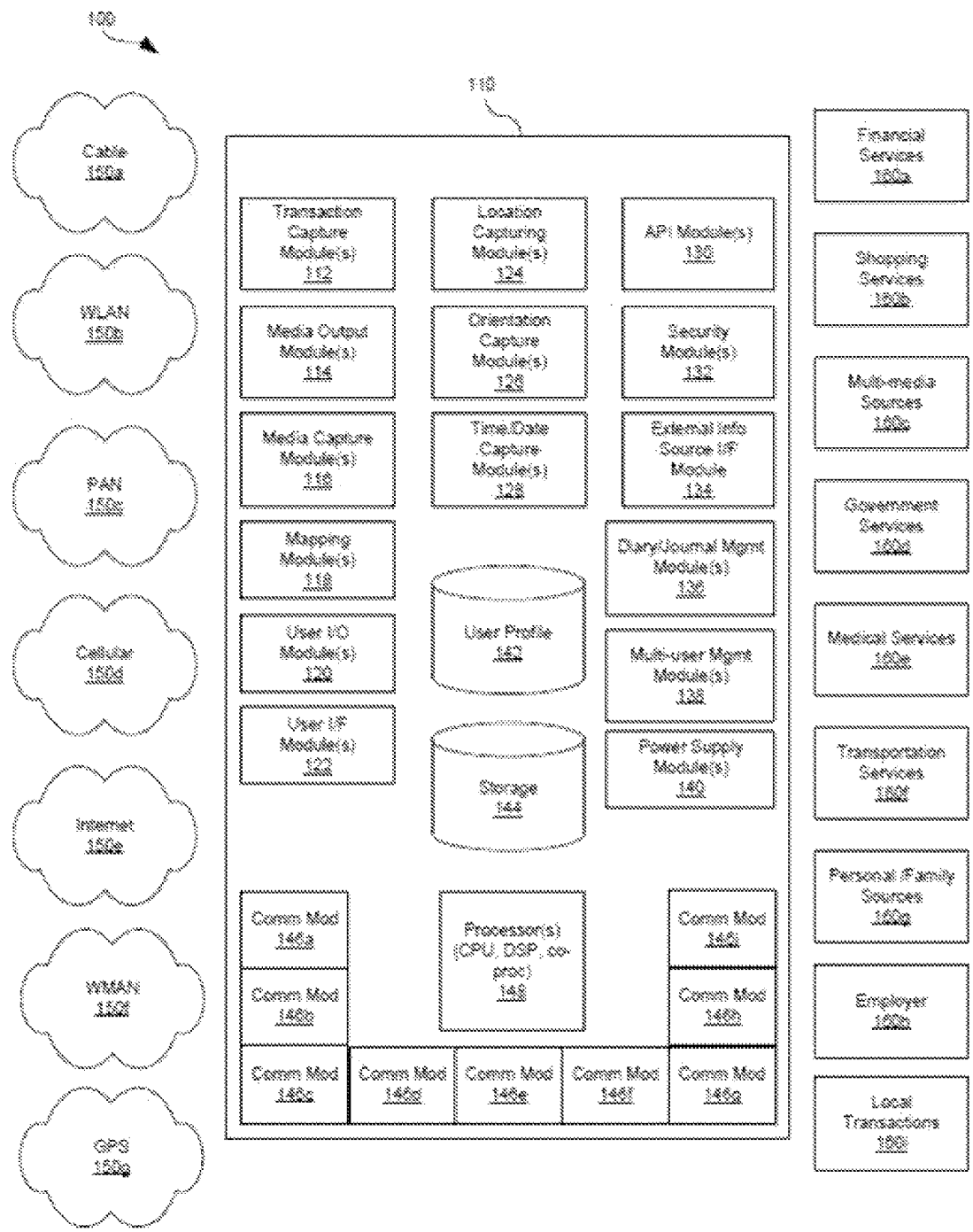
FIG. 1A is a block diagram of an exemplary system and/or multi-media device enabled to provide a digital diary system, in accordance with an embodiment of the invention.

A wireless communication device may generate an interactive digital diary that comprises a plurality of digital diary records. Digital diary records may be generated based on default settings, a stored user profile, and/or ad hoc user input, for example. The interactive digital diary may associate and/or link generated and/or processed multi-media information with determined location information or an identified location. The digital diary records may comprise, for example, moving images, still images, audio, text, geographic location, entity information, time, date, transactions, financial information, consumer information, security information, user input, communications, links, user contacts, software applications, user profiles, scheduled events, prompts, and/or reminders. The digital diary records may further record browsing activities, user interface activities, and any and all other interaction that a user may have with his/her device. Furthermore, information for the digital diary records may be stored within the wireless communication device and/or external to it.

In accordance with an embodiment of the invention, information for the digital diary records may be communicated and/or updated via one or more of a plurality of wireless, optical, and/or wired communication technologies. In addition, digital diary records may be searchable based on one or more criteria comprising time, date, geographic location, entity, contact and user identity, for example. Access to the digital diary records may involve authentication and communication of digital diary records using encryption and/or decryption. Multi-media, which comprising voice, audio, still and/or moving images and/or text, for example, may be captured utilizing one or more of a camera, microphone, geo-location data receiver, transaction write/reader, digital clock, digital calendar, key entry, tactile sensor. In various embodiments of the invention, financial and/or security transactions based on one or more digital diary records may be executed within the interactive digital diary. The interactive digital diary may enable a user to capture, process, access and/or update.

According to other aspects of the present invention, the digital diary records (digital diary data) may be used to select content and/or advertisements for presentation to a user of the smart phone. The presentation may be performed on the smart phone itself or on another device. According to one aspect of the present invention, the digital diary data is uploaded from the smart phone to a home gateway/Set Top Box (STB) of a premises in which the user of the smart phone resides or is often present. The smart phone may be registered with the home gateway/STB, receive service in conjunction with the home gateway/STB or otherwise be related to such. The digital diary data is uploaded either directly or indirectly from the smart phone to the home gateway/STB. The home gateway/STB then uses the digital diary data to communicate with a remote server to deliver at least some of the digital diary data to the remote server. The remote server processes the digital diary data, prepares content based thereon, and then downloads the content to the home gateway/STB.

The content downloaded may be advertisements, a customized media channel guide, links to content or advertisements, links to other sites that may provide video games, links to other sites that offer electronic books, links to sales sites, links to sales portals or other content. Because the content is tailored to the user based upon the digital diary data, there is a likelihood that the user of the smart phone may make use of this offered content, which would benefit the content provider or its affiliated company(ies). This content may be downloaded to the smart phone, may be presented on a coupled display, or may downloaded to another device that is associated with a user of the smart phone. These concepts may be extended to multiple smart phones of a household/entity/set of users and to other content as well.

FIG. 1A is a block diagram of an exemplary system and/or multi-media device enabled to provide a digital diary system, in accordance with an embodiment of the invention. Referring to FIG. 1A there is shown a non-limiting digital diary system 100 comprising a non-limiting plurality of communication protocols and networks comprising cable 150a, WLAN 150b, PAN 150c, Cellular 150d, Internet 150e, WMAN 150f and GPS 150g, a plurality of non-limiting electronic resources financial services 160a, shopping services 160b, multi-media services 160c, government services 160d, medical services 160e, transportation services 160f, personal/family sources 160g, employer 160h and local transaction sources 160i. In addition, the digital diary system 100 may comprise a multi-media device 110 wherein a plurality of hardware/software modules may comprise one or more of transaction capture module(s) 112, media output module(s) 114, media capture module(s) 116, mapping module(s) 118, user I/O module(s) 120, user interface module(s) 122, location capture module(s) 124, orientation module(s) 126, time/date capture module(s) 128, API module(s) 130, and security module(s) 132. The digital diary system 100 may also comprise an external information source interface module(s) 134, diary management module(s) 136, multi-user management module 138, power supply module 140, user profile 142, internal and/or external storage module(s) 144, one or more processors 148, and/or a plurality of communication modules 146a through 146i.

The multi-media device 110 may comprise suitable logic, circuitry and/or code that may be a mobile or portable device that may be a part of or may comprise characteristics and/or features of one or more computing devices and/or one or more communication devices. Exemplary computing devices and/or communication devices may comprise a mobile phone, a handheld or installed geo-location and/or mapping device, a portable computer, a personal digital assistant, a media player for audio, video and/or still imagery, a media recorder for audio, video and/or still imagery, a transaction device for commercial or financial exchanges, a portable email device and/or Internet access device. In this regard, the multi-media device 110 may communicate via one or more communication modules 146a through 146i which may be adapted to establish and/or maintain communication over one or more of a plurality of protocols and networks, for example, 150a through 150g. The one or more communication modules 146a through 146i may communicate via one or more of wireless, wire-line, optical and/or backplane technology, for example. Notwithstanding, the invention is not limited to utilization of any specific type of communication protocol and/or network and may utilize any suitable communication technology.

The multi-media device 110 may comprise suitable logic, circuitry and/or code that may be enabled to communicate with one or more of a plurality of resources, for example, 160*a* through 160*i*. The one or more of the plurality of resources may be communicatively coupled and or networked with the multi-media device 110. The plurality of resources, for example 160*a* through 160*i* may communicate with and/or provide information for the multi-media device 110. In this regard, the multi-media device 110 may communicate with and/or link to external entities, contacts and/or users of the digital diary system 100 for example.

The multi-media device 110 may comprise suitable logic, circuitry and/or code that may comprise a plurality of hardware and/or software modules that are operable to implement a digital diary. For example, the plurality of hardware/software modules may enable the multi-media device 110 to utilize and/or associate event information, media, location, time, date and/or user input to create a digital diary entry and/or manage the digital diary. The multi-media device 110 may gather and/or log information and/or manage the digital diary independently or may be communicatively coupled with other devices. For example, the digital diary may be running on a first multi-media device 110 while a second device may capture information, for example, media data and may communicate and/or manage the information for the first multi-media device 110. In this regard, various hardware/software modules may be external to the multi-media device 110 and/or distributed within a communication network.

The transaction capture module(s) 112 may comprise suitable logic, circuitry and/or code that may be operable to capture transactions that a user and/or the multi-media device 110 may conduct. For example, financial, commercial, and/or physical access transactions may be captured. Exemplary captured transactions wherein the multi-media device 110 may be utilized to handle the transaction may comprise a credit or debit purchase, a banking transaction over the phone, purchase and/or download of music and/or entry into a secure building. The transaction module(s) 112 may capture various information associated with a transaction, for example, product or service information, price, vendor, parties or entities involved, tax information, account numbers, security information, time, date and/or location of a transaction. In various embodiments of the invention, the multi-media device 110 may enable a transaction by communicating transaction information with another device. In addition, transaction records may be associated with other digital diary information.

The media output module(s) 114 may comprise suitable logic, circuitry and/or code that is operable to provide digital diary information output functionality. For example, the media output module(s) 114 may be enabled to recall, for example, media, text, user input and/or transaction information based on associated information, for example, one or more of text, a time or time duration, date, location, an external entity such as an establishment, a contact, user and/or an event. In various embodiments of the invention, the output module(s) 114 may be adapted to display a map comprising hyperlinks and/or icons associated with the digital diary information.

The media capture module(s) 116 may comprise suitable logic, circuitry and/or code that is operable to create and/or acquire media data that may be associated with other digital diary information and/or entered into the digital diary. For example, the media capture module(s) may generate, receive, process and/or store one or more of text, audio, still digital images and/or video data. In some embodiments of the invention, the media capture module(s) 116 may communicate media data with other hardware/software modules and/or media devices. In addition, media data from external sources may be utilized.

The mapping module(s) 118 may comprise suitable logic, circuitry and/or code that is operable to acquire location information and generate and/or display maps. The location information may be associated with digital diary information and the maps may indicate locations significant to digital diary information. In various embodiments of the invention, a map may comprise hyperlinks and/or icons linked with associated digital diary information.

The user I/O module(s) 120 may comprise suitable logic, circuitry and/or code that is operable to accept and/or provide user input for the digital diary. For example, the user I/O module(s) 120 may receive information entered via a user interface for use in a digital diary entry and/or for associating various digital diary information.

The user interface module(s) 122 may comprise suitable logic, circuitry and/or code that enables a user to interact with and/or communicate with the multi-media device 110 in a plurality of ways. For example, the user interface may display visual and/or audio output from the digital diary and may receive input from the user. For example, the user interface module(s) 122 may be adapted to receive user input via one or more methods, for example, motion, tactile or pressure assertions, voice or audio, key entry, RF ID and/or other machine readable representations and/or a tethered or wireless device such as a mouse. In addition the user interface module(s) 122 may enable launching and/or communicating with various software/hardware modules, applications, operations or commands that may be internal to the multi-media device 110 or on an external device. In various embodiments of the invention, the user interface module(s) 122 may enable web browsing and/or user manipulation of access to networked or peer to peer devices and/or applications. Moreover, the user interface module(s) 122 may enable a user to search, organize and/or review digital diary information.

The location capture module(s) 124 may comprise suitable logic, circuitry and/or code that is operable to acquire, process and/or generate location information which may be associated with other digital diary information. In this regard, the location capture module(s) 124 may be operable to receive geo-location data from a global navigation satellite system such as GLONASS, GPS, and/or Galileo to capture location information. Moreover, the location information may be received from a network such as a cellular network and/or a local device or network. In some embodiments of the invention the location capture module(s) may determine a location based on received location information and triangulation or time-distance of arrival data. Moreover, a user may provide input with regard to location. For example, a user may select a position on a map. The invention is not limited to a specific location technology and/or method and may utilize any that are suitable for location determination. The location capture module(s) 124 may function based on a user request or may operate in the background, for example, routinely or based on requests from other modules and/or applications. The orientation capture module(s) 126 may comprise suitable logic, circuitry and/or code that is enabled to provide orientation information such as pointing based on one or more methods and/or technologies, for example, a compass, gyroscope, wireless communication and/or user input. The orientation information may be associated with other digital diary information and may be utilized by the mapping module(s) for example.

The time/date capture module(s) 128 may comprise suitable logic, circuitry and/or code that is operable to utilize an internal clock and/or calendar as well as external and/or network sources of time and/or date information to provide the digital diary with time and/or date information. In this regard, the time/date information may be utilized by other modules and may be associated with other digital diary information.

One or more application interface modules (API) 130 within the multi-media device 110 may be operable to interface with software and/or hardware applications that may execute on the multi-media device 110 or within the digital diary system 100. In this regard, the digital diary hardware and/or software modules may be communicatively coupled with various other applications. Exemplary hardware/software applications that the API module(s) 130 may interface with are finance software, travel expense software, personal expense accounts, tax software, a browser application and/or email.

The security module(s) 132 enable secure access and/or secure communication with the multi-media device 110. The security module(s) 132 may be operable to handle a plurality of security functions that may protect information on the multi-media device 110. In addition, the security module(s) 132 may be operable to comply with secure access and/or secure transfer of data managed by other devices or systems. Exemplary security methods comprise user and/or device authentication, public key infrastructure and/or digital signatures, data encryption/decryption and/or digital rights management.

The external information source module(s) 134 may comprise suitable logic, circuitry and/or code that is operable to seek and acquire various types of information through one or more communication networks. For example, the external information source module(s) 134 may seek information for the digital diary from the internet, a private network and/or a peer device. In this regard, the external information source module(s) 134 may seek information from one or more of the resources 160a through 160i. In various embodiments of the invention, the digital diary may receive updated data from one or more resources such as 160a through 160i when digital diary information has become obsolete and/or new information associated with digital diary information is available. For example, the external information source module(s) 134 may seek availability of an item or a change in price from a store or financial institution.

The diary management module(s) 136 may comprise suitable logic, circuitry and/or code that organizes and/or manages digital diary information for accessing, updating, outputting and/or processing the digital diary information. In this regard, the diary management module(s) 136 may associate and/or group various stored, linked and/or accessible digital diary information to form a digital diary entry record. For example, events transactions, media and/or user input may be associated based on one or more factors such as date, time, location, orientation, user, contact, event and/or entity involved. Accordingly, digital diary information may be "stamped" with date, time, location, orientation, user, contact, event and/or entity involved, for example. In addition, a plurality of entries and/or records may be associated according to a specified theme or a shared factor. For example, a diary of vacation related entries or a series of purchases or transactions of a certain type or with a specified entity may be grouped or associated. In addition, the diary management module(s) 136 may request, receive and/or respond to user input with regard to user preferences for diary management, information input and/or information associations and/or information queries for example. In this regard, the diary management module(s) 136 may enable linking, storing, associating, organizing and/or outputting digital diary information.

The diary management module(s) 136 may comprise suitable logic, circuitry and/or code that may be operable to determine and/or manage how digital diary information may be displayed. For example, events and/or transactions may be displayed on a map with links and/or icons to digital diary information associated with a particular location. Events and/or transactions may also be charted over time, for example, in a calendar or time line with links to associated digital diary information. Text and or multi-media may also be utilized to represent a digital diary and may provide links to associated information. Presentation of digital diary information may be managed by default parameters and/or may be based on an application, user input and/or a user profile, for example.

The multi-user management module(s) 138 may comprise suitable logic, circuitry and/or code that enables a plurality of users to access, manage and/or utilize a multi-media device 110 and/or system 100. In this regard, the multi-user management module(s) 138 may enable protected access to the device and/or digital diary information along with the security module(s) 132. In addition, the multi-user management module(s) 138 may tailor and/or adapt digital diary functionality and/or appearance according to a user's preferences. For example, user preferences may indicate within a user profile for one or more users via the user interface module(s) 122. The user preferences may determine which information is utilized and how information is associated and/or presented for example.

The power supply module(s) 140 may comprise its own power source, for example, rechargeable batteries and/or may receive and/or utilize power from an external source.

The user profile module(s) 142 may comprise user specific preferences for digital diary functionality and/or appearance or presentation of digital diary output for one or more users. For example, the user profile module(s) 142 may comprise user input regarding collection of digital diary information and/or associations to be made between various digital diary information and/or other available data such as time, date and/or location. For example, a user profile may define a specific diary that a user may wish to create, display and/or interact with, for example, a photo album, a documentary movie, a contact list, daily journal, travel log, business and/or transaction record. The user may specify types of media, transactions, user input to collect and associate along with various markers such as time, date and/or location. The user may specify a type of display for a digital diary such as text, media, map, calendar and/or chart for example. In addition, the user profile module(s) 142 may comprise user specific security information for one or more users.

The internal and/or external storage module(s) 144 may be on board the multi-media device 110 and/or may reside on a connected and/or networked device. The internal and/or external storage module(s) 144 may be implemented utilizing any suitable storage media. In an exemplary embodiment of the invention, a portion of the digital diary information may be stored locally in non-volatile memory on the multi-media device 110, a portion may be stored in a database on a networked device while additional information may be accessed and downloaded as needed for digital diary output and/or a user request. In this regard, the multi-media device 110 may maintain pointers and/or designations to locally and/or remotely stored information. Moreover, pointers and/or designations may be updated when data is moved. In addition, pointers and/or metadata may be attached to media data, transaction data, location data and/or any other digital diary data.

The processor module(s) 148 may comprise one or more general purpose and/or special purpose processors or hardware modules. For example, the processor module(s) 148 may comprise a CPU, one or more co-processors and/or one or more digital signal processors and/or accelerators. In this regard, the processors may execute a digital diary application comprising one or more software modules. In an exemplary embodiment of the invention, the digital diary comprises software that may be executed on server. In this regard, the digital diary may be accessed remotely and/or output may be viewed on a handheld device for example.

Figure 1B:
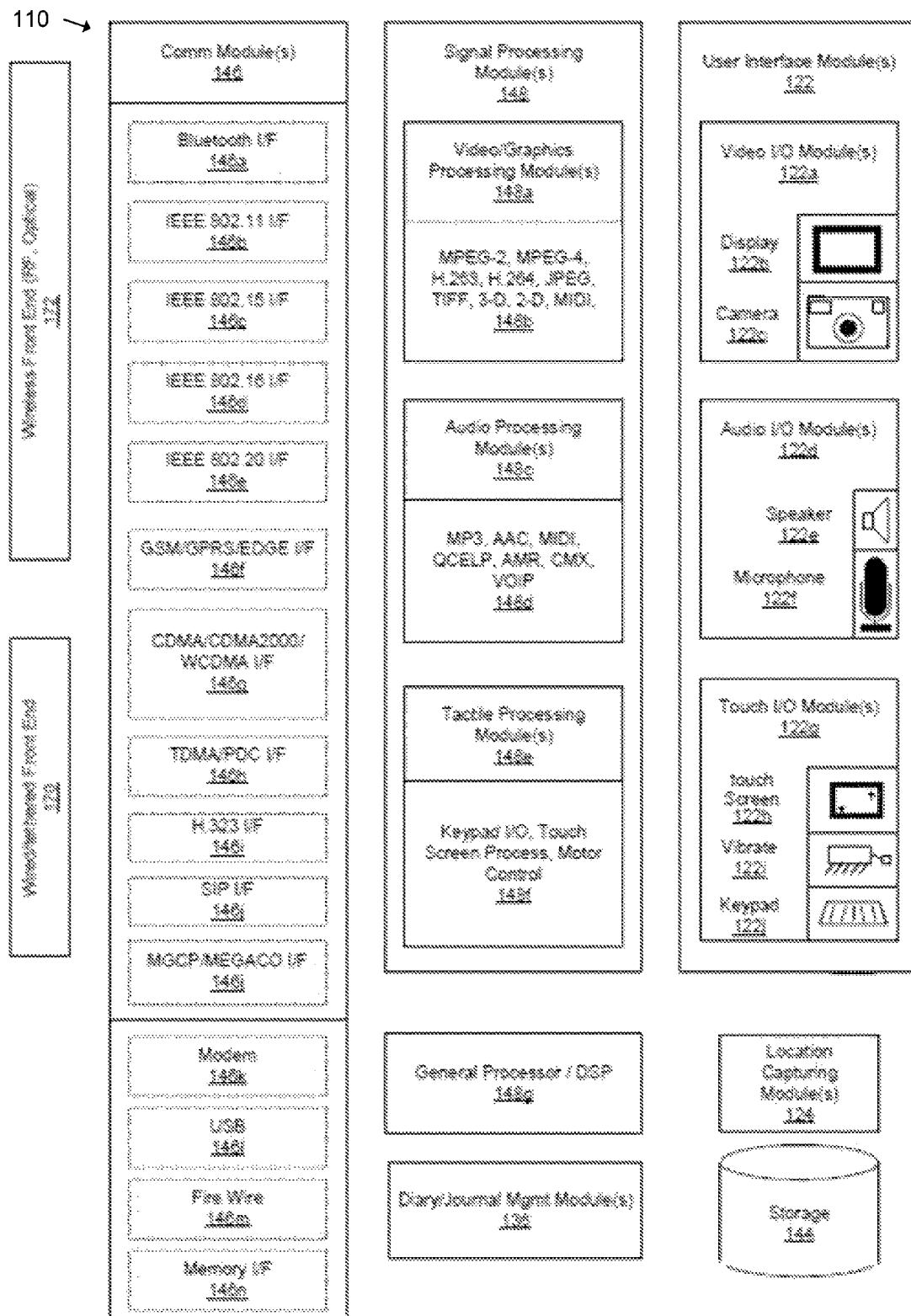
FIG. 1B is a block diagram of an exemplary multi-media device enabled to create and/or manage a digital diary, in accordance with an embodiment of the invention.

FIG. 1B is a block diagram of an exemplary multi-media device enabled to create and/or manage a digital diary, in accordance with an embodiment of the invention. Referring to FIG. 1B, there is shown, a multimedia device 110 which may comprise a plurality of communication modules 146, a plurality of processors 148, a plurality of interface modules 122, location capture module(s) 124, diary management module(s) 136, internal and/or external storage module(s) 144, a wired and/or tethered front-end 170 and a wireless front-end 172.

The multi-media device 110 shown in FIG. 1B may be similar or substantially the same as the device 110 described with respect to FIG. 1A. In this regard, the multi-media device 110 may comprise the communication module 146 described with respect to FIG. 1A, which may comprise a Bluetooth interface 146a, IEEE 802.11 interface 146b for wireless local area network (WLAN) communications, IEEE 802.14 interface 146c wireless, personal area network (PAN), IEEE 802.16 interface 146d wireless broadband metropolitan networks, IEEE 802.20 interface 146e mobile broadband wireless access (MBWA) for IP based networks. In addition, the communication module 146 may comprise wireless technologies such as GSM, GPRS, EDGE and/or UMTS interface 146f, CDMA, CDMA 2000, and/or WCDMA interface 146g, TDMA and/or personal digital cellular (PDC) interface 146h. The communication module 146 may comprise may also support H.323 interface 146i voice and/or video over IP, session initiation protocol (SIP) 146j, media gateway control protocol (MGCP) and/or gateway control protocol MEGACO interface 146k, a modem 146l, universal serial bus interface (USB) 146m and/or a memory interface 146n.

The processors 148 may be similar or substantially the same as the processors 148 described with respect to FIG. 1A. In this regard the processors 148 may comprise video and/or graphics processing module(s) 148a which may be enabled to process, for example, MPEG-2, MPEG-4, H.263, H.264, JPEG, TIFF, 3-D, 2-D, MIDI files 148b. In addition, the processors 148 may comprise a tactile and processing module 148e which may be enabled to process keypad I/O, touch screen and/or motor control information 148f. In addition, the processors 148 may comprise a general purpose processor and/or digital signal processor (DSP) 148g.

The user interface module 122 may be similar or substantially the same as the user interface module 122 described with respect to FIG. 1A. In this regard, the user interface module 122 may comprise a video input/output module 122a with a display 122b and camera 122c. In addition, the user interface module 122 may comprise an audio input/output module 122d, a speaker 122e and/or a microphone 122f. Moreover, the user interface module 122 may comprise a touch input/output module 122g, a touch screen 122h, a vibration output module 122i and/or a keypad 122j. The location capture module(s) 124, diary management module(s) 136 and internal and/or external storage module(s) 144 may be similar and/or substantially the same as the diary management module(s) 136 and internal and/or external storage module(s) 144 described with respect to FIG. 1A. The wired and/or tethered front-end 170 and the wireless front-end 172 may comprise suitable logic, circuitry and/or code including a plurality of physical connectors that is configured for transmission and/or reception of information from or to the communication modules 146a through 146n.

In operation, a digital diary may be generated within a multi-media device 110 and/or digital diary system 100. In this regard, data, for example, multi-media data may be captured via the camera 122c and/or microphone 122f. In addition, text, transaction data, time, date and/or location data may be captured by the keypad 122j, transaction capture module(s) 112, time/date capture module(s) 128 and/or location capture module(s) 124 respectively. Captured data may be stored internally and/or externally and/or may be identified by pointers and/or designations. The captured data may be associated with other data utilizing, for example, tags and/or metadata. Digital diary output may be conveyed to a user utilizing, for example, multi-media output such as text, audio, photos or video, maps and/or charts that may be interactive, for example. In this regard a user may access information associated with displayed information via links and/or icons via the touch screen 122h for example. A user may specify various aspects of digital diary generation and/or output. An exemplary digital diary may comprise a travel diary from a user's personal vacation. In this regard, a map may be displayed indicating a route taken while traveling on vacation and may provide links to sights of interest, hotels and/or restaurants visited. In addition, the diary may comprise commercial transaction records such as from credit card usage at the visited sites. Moreover, the map may provide links to the commercial transaction records and/or to websites of the visited sites. The map may also provide links to any other information associated with items in the travel diary and/or mapped locations, for example, times, dates, photos and/or multi-media recordings, email messages, audio or voice files, contact information and user provided information. Moreover, output from the digital diary may be organized into one or more reports.

Figure 2:
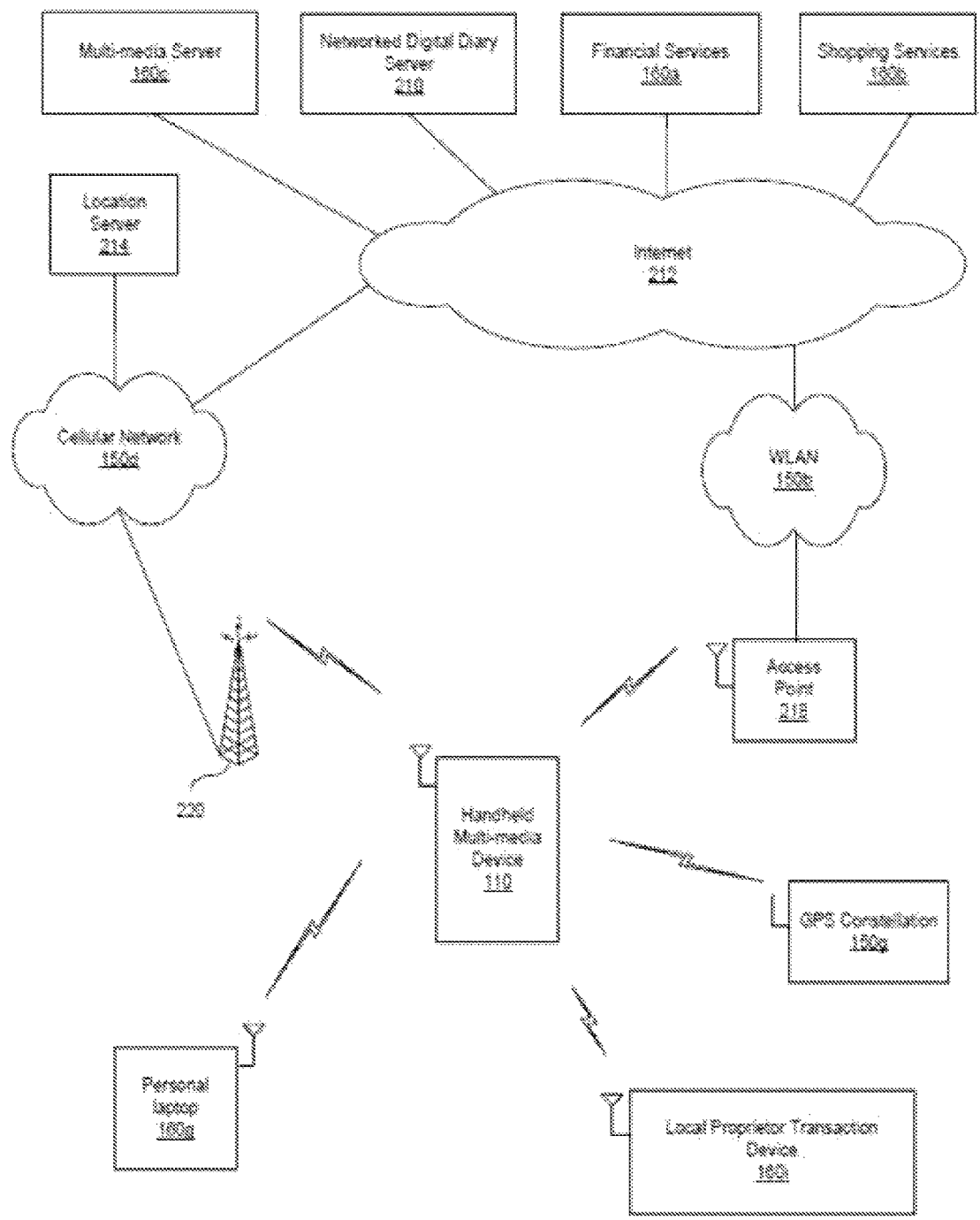
FIG. 2 is a block diagram of exemplary multi-media device enabled to communicate information to and/or from other devices, in accordance with an embodiment of the invention.

FIG. 2 is a block diagram of exemplary multi-media device enabled to communicate information to and/or from other devices, in accordance with an embodiment of the invention. Referring to FIG. 2, there is shown the multi-media device 110, the multi-media server 160c, a networked digital diary server 210, the financial services 160a, the shopping services 160b, the Internet 212, the cellular network 150d, a location server 214, a cellular base station 220, the WLAN 150b, an access point 218, a GPS satellite network 150g, the local transaction source 160i and the personal/family source 160g.

A plurality of the devices and/or services shown in FIG. 2, for example, the multi-media device 110, multi-media server 160c, financial services 160a, shopping services 160b, cellular network 150d, WLAN 150b, GPS satellite network 150g and local transaction source 160i may be similar or substantially the same as the respectively numbered devices and/or services shown in FIG. 1A. In addition, the networked digital diary server 210 may store digital diary information and/or applications that may be downloaded to the multi-media device 110. For example, the multi-media device may access the networked digital diary server 210 upon activation of a digital diary application on the multi-media device 110 and/or may retrieve data from the networked digital diary server based on a request from a user or local application for example.

The Internet 212 may provide access to a plurality of servers that the multi-media device may access for information and/or transactions. For example, a user may purchase and/or download multi-media files from the multi-media server 160c, may execute banking transactions with the financial services 160a and/or may purchase products and/or services from the shopping services 160b via the Internet 212. In this regard, the purchases and/or acquisitions of data may be recorded and may be time, date and/or location stamped for the user's digital diary. Moreover, a connection to the plurality of servers accessible via the internet 212 may be made via one or more of a plurality of networks. For example, the multi-media device 110 may access the Internet 212 via a wireless connection with an access point 218 and a WLAN and/or via a wireless connection with the cellular base station 220 and the cellular network 150d.

In operation, the multi-media device 110 may capture, store and/or identify information for one or more users and/or may utilize the information for creating and/or updating digital diary records. In addition, the multi-media device 110 may present digital diary information to a user in one or more of a plurality of ways. In this regard, the multi-media device 110 may access a plurality of devices and/or networks to store and/or retrieve data for the digital diary. For example, the multi-media device may retrieve data from and/or store data on, for example, the multi-media server 160c, the networked digital diary server 210, the financial services 160a and/or shopping services 160b via the internet 212. In addition data may be exchanged between the multi-media device 110 and one or more local devices. For example, a local device may be the personal/family source 160g which may be a personal laptop enabled to exchange data with the multi-media device 110 via a Bluetooth 146a, ZigBee or WLAN connection, for example. Moreover, an exemplary local transaction source 160i may be a payment transaction device in a restaurant that may enable the multi-media device 110 to record a credit, debit and/or other electronic financial transaction.

In various embodiments of the invention, the multimedia device may obtain location, time and/or date information from the GPS satellite network 150g. Accordingly, the location server 214 which may be accessible via the cellular network 150d may assist in determining time, date and/or location or may take the place of the GPS satellite network 150g when GPS data may not be available. In this regard, the multi-media device 110 may stamp digital diary information with corresponding time, date and/or location information.

Figure 3:
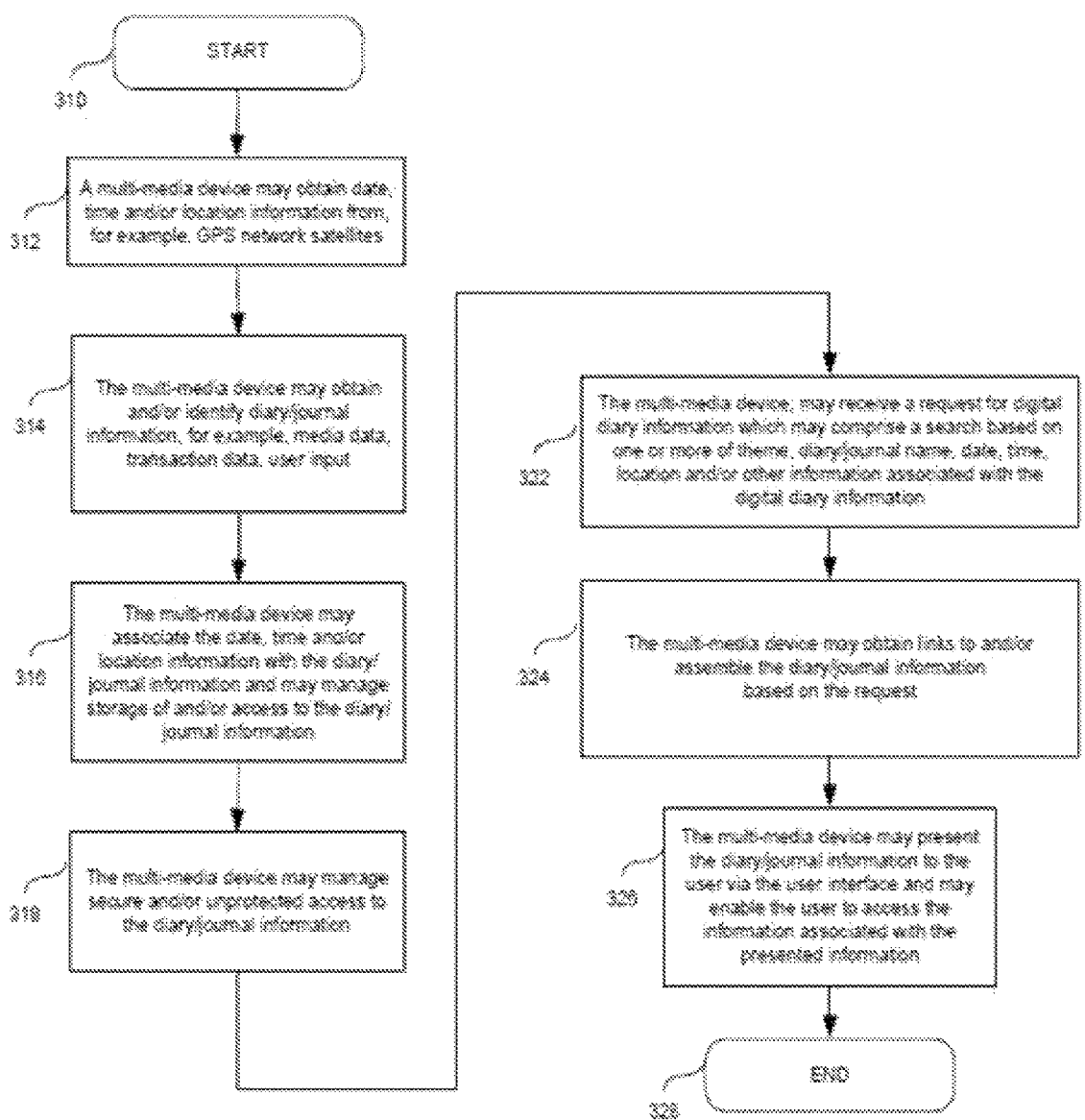
FIG. 3 is a flow chart illustrating exemplary steps for managing a digital diary, in accordance with an embodiment of the invention.

FIG. 3 is a flow chart illustrating exemplary steps for managing a digital diary, in accordance with an embodiment of the invention. Referring to FIG. 3, after start step 310, in step 312, a multi-media device 110 may obtain date, time and/or location information from, for example, GPS network satellites 150g. In step 314, the multi-media device 110 may obtain and/or identify diary information, for example, media data, transaction data, user input. In step 316, the multi-media device 110 may associate the date, time and/or location information with the diary information and may manage storage of and/or access to the diary information. In step 318, the multi-media device 110 may manage secure and/or unprotected access to the diary information. In step 322, the multi-media device 110 may receive a request for digital diary information which may comprise a search based on one or more of criteria comprising theme, diary name, date, time, location and/or other information associated with the digital diary information. In step 324, the multi-media device 110 may obtain links to and/or assemble the diary information based on the request. In step 326, the multi-media device 110 may present the diary information to the user via the user interface 122 and may enable the user to access the information associated with the presented information.

In an embodiment of the invention, a wireless communication device 110 may generate process and/or provide links to multimedia information. In addition, the wireless communication device 110 may be operable to determine or identify its location, for example, a location where the generation of multi-media and/or processing occurs or a location associated with the multi-media information. Moreover, the wireless communication device 110 may generate an interactive digital diary that may comprise one or more digital diary records. Accordingly, digital diary records may be generated based on default settings, a stored user profile and/or ad hoc user input, for example. The interactive digital diary may associate and/or link the generated, processed and/or linked multi-media information with the determined location information and/or a transaction, for example. The digital diary records may comprise, for example, associated moving images, still images, voice, audio, text, geographic location, entity information, time, date, transactions, financial information, consumer information, security information, user input, communications, links, user contacts, software applications, user profiles, scheduled events, prompts and/or reminders. Furthermore, information for the digital diary records may be stored within the wireless communication device, for example in storage 144 and/or external to it, for example, within the multi-media server 160c, the networked digital diary server 210, the financial services 160a and/or the shopping services 160b.

In various embodiments of the invention, a user interface 122, which may be presented on a display of the wireless communication device 110, may be operable to display the interactive digital diary. In this regard, various digital diary records and/or links associated with the digital diary records may be presented within various contexts, for example, within maps, time frames, narrative, collage, voice, audio, video, text, data, icons, charts, and tables. The time frames may comprise calendars and/or time lines for example. Also, the user interface 122 may enable display of one or more links and/or icons that may provide access to one or more external entities, for example financial services 160a, shopping services 160b, multi-media services 160c, government services 160d, and medical services 160e. In addition, link access may be provided to a plurality of networks, servers, applications and contacts. For example, the user interface may display a map of digital diary information wherein icons and/or hyperlinks may enable users to access additional information associated with the corresponding digital diary record. Moreover, the user interface 122 may also provide links to web servers, for example, via the Internet 212 or to contacts associated with the digital diary record. In this manner, associating and/or linking information for the interactive digital diary may utilize metadata, tags and/or designations. User input via the user interface 122 may comprise one or more of a plurality of methods, for example, screen touch, pressure sensor, key entry and voice.

In accordance with an embodiment of the invention, information for the digital diary records may be communicated and/or updated via one or more of a plurality of wireless, optical and/or wired communication technologies such as 150a through 150g. In addition, digital diary records may be searchable based on one or more criteria comprising time, date, geographic location, entity, contact and user identity, for example. Access to the digital diary records may involve authentication and communication of digital diary records may involve encryption and/or decryption. Multimedia, which may comprise audio, still and/or moving images and text for example, may be captured utilizing one or more of a camera 122c, microphone 122f, geo-location data receiver 124, transaction write/reader 112, digital clock, digital calendar, key entry 122j, tactile sensor 122h. In various embodiments of the invention, financial and/or security transactions based on one or more digital diary records may be executed within said interactive digital diary and/or wireless communication device 110. The interactive digital diary may enable a user to capture, process, access and/or update a personal history of activity with a wireless communication device 110.

Figure 4:
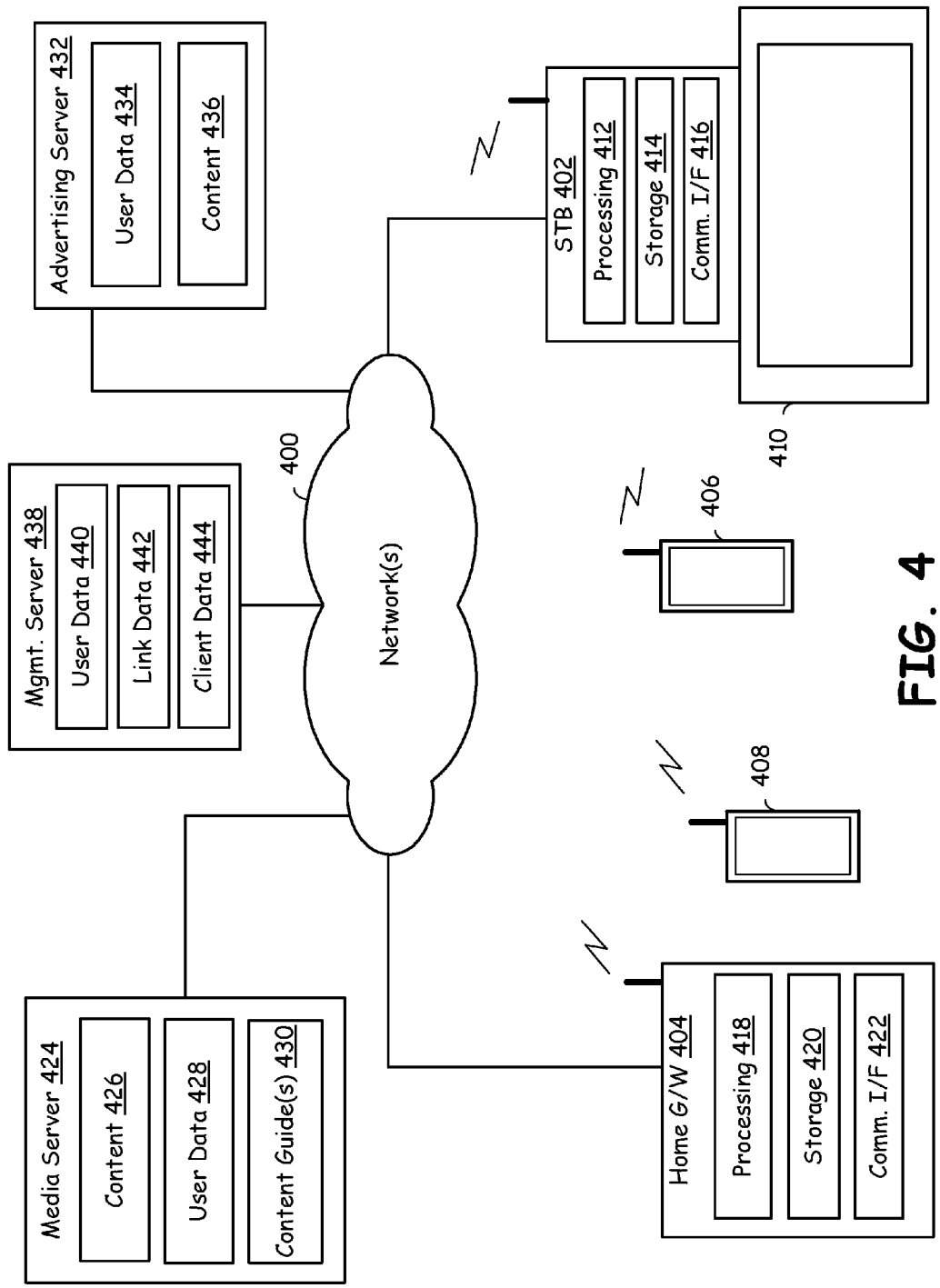
FIG. 4 is a system diagram illustrating components of a system operating in accordance with one or more embodiments of the present invention.

FIG. 4 is a system diagram illustrating components of a system operating in accordance with one or more embodiments of the present invention. The system includes a home gateway (G/W) 404, a Set Top Box (STB) 402, one or more communications network(s) 400, a plurality of smart phones 406 and 408, a media server 424, an advertising server 432, and a management server 438. The network(s) 400 may include one or more of the Internet, the World Wide Web (WWW), one or more Local Area Networks (LANs), one or more Wide Area Networks (WANs), one or more Personal Area Networks (PANs), one or more cellular communication networks, one or more Metropolitan Area Networks, and/or other types of networks. These network(s) 400 may service one or both of wired and/or wireless communications. These network(s) 400 serve to inter couple communications among the home G/W, the STB 402, the Media Server 424, the Advertising Server 432, the management server 438, and the smart phones 406 and 408. Each of the smart phones 406 and 408 may have a construct as previously described herein. Each of the home G/W 404 and STB 402 includes processing 418/412, storage 420/414, and communication interface 422/416 resources to support the operations of embodiments of the present invention. The STB 402 may service a coupled entertainment system, which may include a monitor 410 and sound system.

Media server 424 stores content 426, user data 428, and content guide(s) 430 and includes processing, storage, and communication resources to support operations according to embodiments of the present invention and other operations. Advertising server 432 stores content 436 and user data 434 and includes processing, storage, and communication resources to support operations according to embodiments of the present invention and other operations. Management server 438 stores user data 440, link data 442, and client data. The management server 438 may interoperate with the media server 424 and advertising server 432 to manage the selection of media and advertisements according to the present invention, such media and advertisements stored and/or managed by servers 424 and 432, respectively.

According to one or more aspects of the present invention, the home G/W 404 and/or the STB 402 (referred to generally as home gateway/STB is operable to establish communication with a smart phone 406 and/or 408. Such communication may be via WLAN, WPAN, 60 GHz communication, or other communication path. According to one aspect of the present invention, the home gateway/STB awaits proximity with the smart phone 406 or 408 prior to initiating operations of the present invention. According to another aspect of the present invention, triggers are set based upon time, available digital diary data, duration since last digital diary data upload, or other triggering mechanism to upload digital diary data. Differing smart phones 406 or 408 may have differing triggering criteria for upload of the digital diary data. When the upload trigger is based upon proximity, the criteria may be when the smart phone 406 or 408 is within WPAN or 60 GHz communication range of the home gateway/STB or when location coordinates of the smart phone 406 or 408 are within a preset location area.

The home gateway/STB queries the smart phone 406 for digital diary data, which the smart phone 406 has collected over time. The home gateway/STB then receives the digital diary data from the smart phone 406. The home gateway/STB then communicates with a remote server, e.g., media server 424, advertising server 432, or management server 438 to deliver at least some of the digital diary data. The media server 424, the advertising server 432, and/or the management server 438 processes the digital diary data to select media, a media guide, advertisements, links to media, links to advertisement or other content for download (all of these referred to herein as content). The home gateway/STB then receives the content from the remote server 424, 432, and/or 438 that is selected based upon the digital diary data. Then, the home gateway/STB may download the content to the smart phone or present the content on the coupled monitor 410, for example. According to the aspect described previously, the content may be downloaded to the smart phone 406 and/or displayed on the coupled monitor 410 upon determining proximity of the smart phone to the home gateway/STB.

According to various aspects of the present invention, the digital diary data may include information about at least one transaction serviced by the smart phone, information regarding browsing activities of the smart phone, and location data of the smart phone captured over time. The content may be a channel guide that is customized based upon the digital diary data or media selected based upon the digital diary data, which may be displayed via the smart phone 406 or upon monitor 410, for example. The channel guide may indicate content that can be streamed, is broadcast, and/or that is otherwise available to a user of one of the smart phones 406 and 408. The channel guide may be accompanied by previews of available programming on the smart phone 406 or 408. The content may simply be media presented to users of the smart phones 406 and 408 on displays of the smart phone or upon the monitor 410.

The content may be advertisements that are selected based upon the digital diary data by the remote server and/or the home gateway/STB. The advertisements may be delivered to the smart phone for later presentation to the user. As an example of such advertisements, the digital diary data collected indicates that a user of the smart phone 406 frequents certain locations, e.g., office buildings, shopping centers, stores, etc. The advertisements are selected based upon the locations frequented by the user, e.g., local businesses. These advertisements are then presented to the user of the smart phone 406 when the user is proximate to such businesses. These advertisements may also be based upon transactions serviced by the smart phone 406. In another operation, the advertisements are displayed on the coupled monitor/sound system 410 upon detecting that the smart phone is proximate thereto.

According to another aspect of the present invention, the home gateway/STB services multiple smart phones. With such aspect, the home gateway/STB queries a second smart phone for second digital diary data and receives the second digital diary data from the second smart phone. The home gateway/STB then communicates with the remote server (424 or 432) to deliver at least some of the second digital diary data. The home gateway/STB then receives content from the remote server that is selected based upon both the digital diary data and the second digital diary data. This content may be a channel guide presented on monitor 410 or smart phones 406 and 408 that is based upon the combined digital diary data received from smart phones 406 and 408. The channel guide may be a subset of a larger channel guide/content guide 430, which is modified based upon the digital diary data for presentation to a user or users. The content may also be one or more advertisements tailored for the multiple smart phones 406 and 408.

Figure 5:
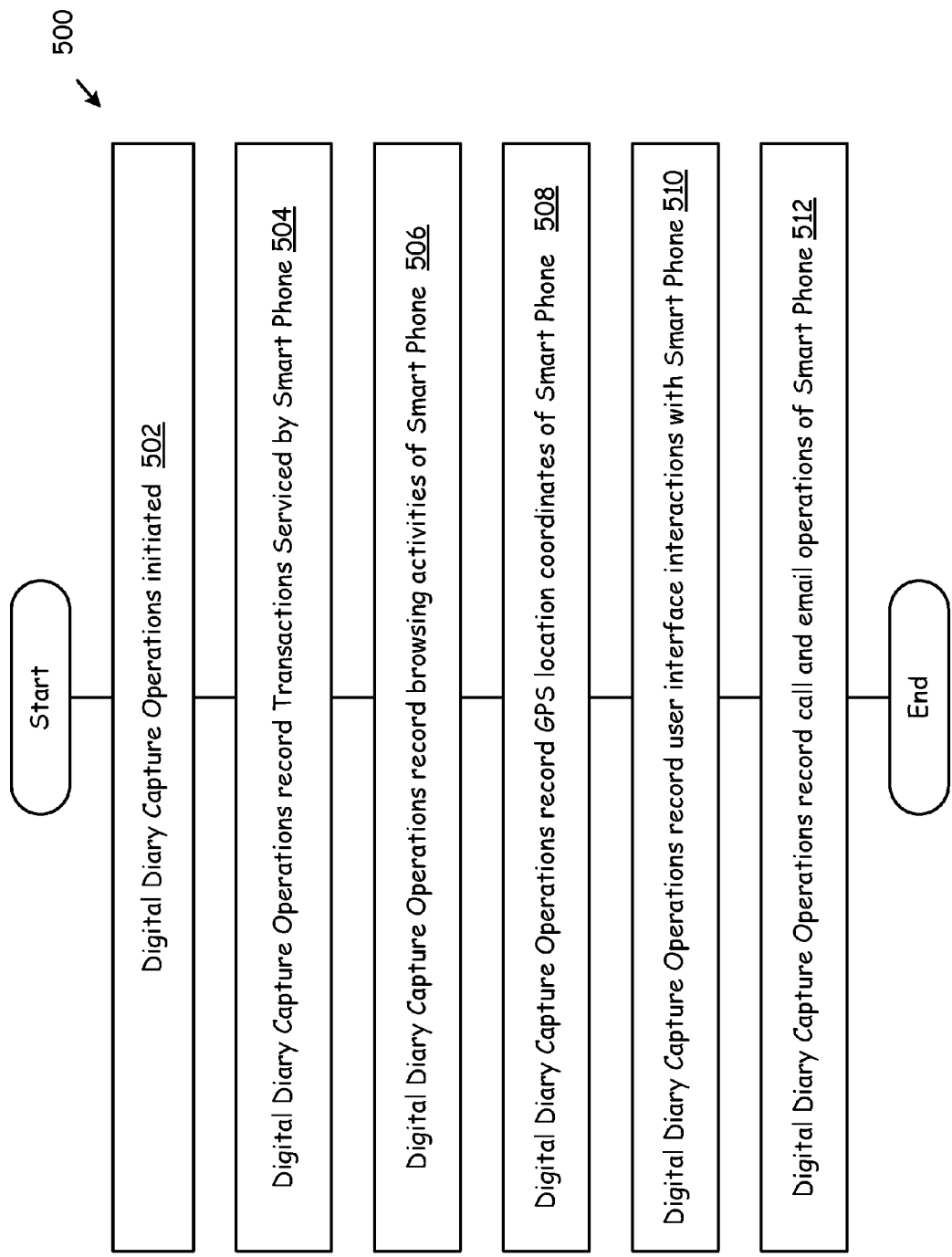
FIG. 5 is a flow chart illustrating operations in accordance with embodiments of the present invention.

FIG. 5 is a flow chart illustrating operations in accordance with embodiments of the present invention. Operations 500 commence with initiation of digital diary capture operations (step 502), which may commence upon startup of the smart phone or upon another event. For example, the digital diary operations may commence once the smart phone is no longer in proximity of its associated home gateway/STB, e.g., when the smart phone cannot communicate with the home gateway/STB via 60 GHz, WLAN, or WPAN communications. Once initiated, the smart phone captures digital diary data for a variety of differing operations. These digital diary capturing operations may include the smart phone capturing information about at least one transaction serviced by the smart phone (step 504), capturing information about the browsing activities serviced by the smart phone for its user (step 506), and capturing location information over time, such as the GPS coordinates of the smart phone over time (step 508). The location information captured may be tailored to the other activities of the smart phone, e.g., the location(s) of the smart phone at various times of the day, the location(s) of the smart phone when it services transactions for the user, the location(s) of the smart phone when it services the browsing activities of the user, and the location(s) of the user when the user makes calls, sends texts, sends emails, etc.

The digital diary capturing operations may also record user interface interactions with the smart phone (step 510), e.g., when the user accesses data on the smart phone, when the user places the smart phone into silent mode, etc. Further, the digital diary capture operations may also record the call and email operations of the smart phone (step 512), e.g., who does the user call at what times, who does the user email at what times, etc. This information may be correlated to other actions of the smart phone such as transactions serviced via the smart phone, locations of the smart phone, and/or other activities of the smart phone.

Figure 6:
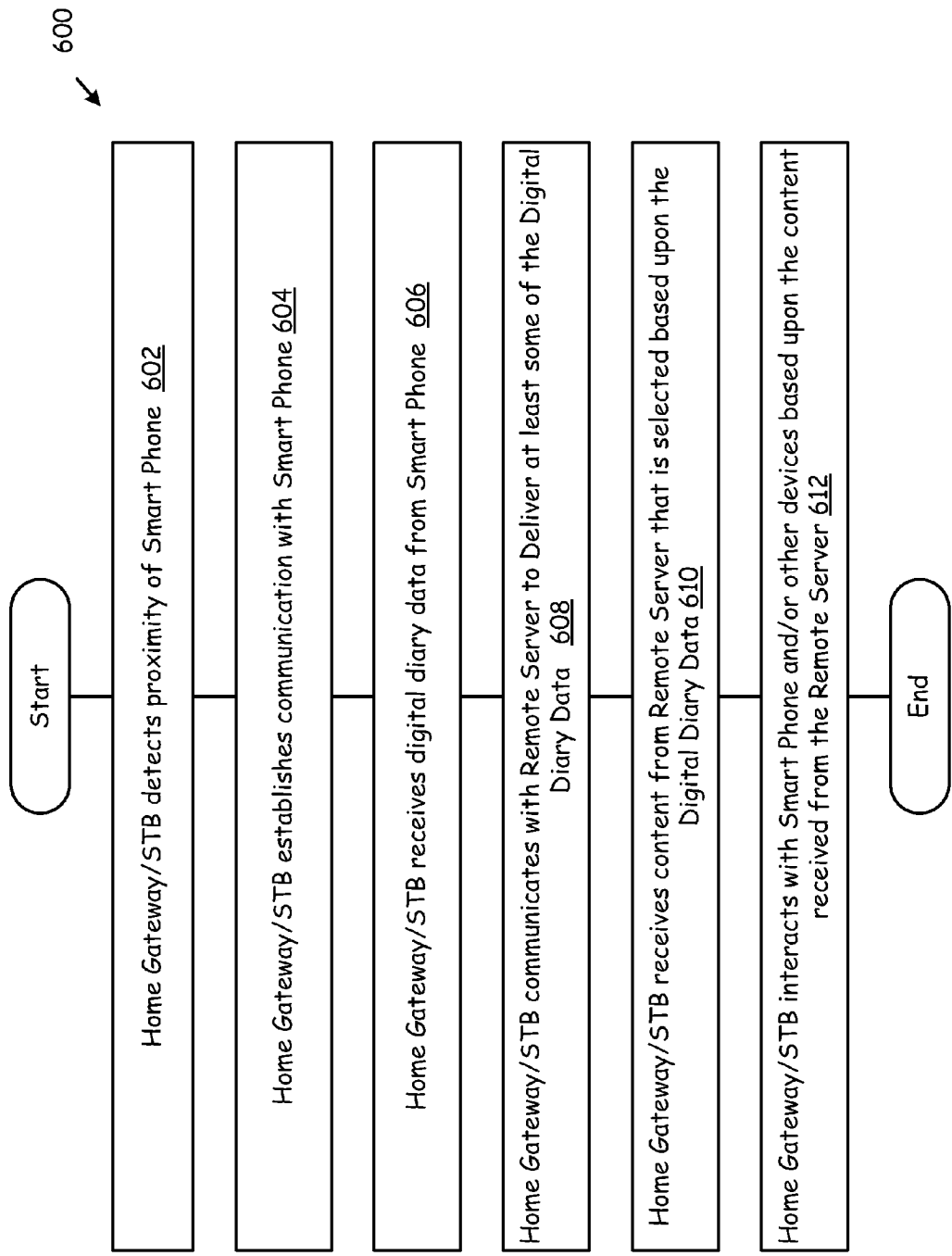
FIG. 6 is a flow chart illustrating operations of a system according to one or more embodiments of the present invention.

FIG. 6 is a flow chart illustrating operations of a system according to one or more embodiments of the present invention. Operations 600 commence with the home gateway/STB detecting proximity of a smart phone that has collected digital diary data (step 602). In one embodiment, the smart phone is registered or paired with the home gateway/STB for the collection of digital diary data and later collection thereof. Operation continues with the home gateway/STB establishing communication with the smart phone (step 604), e.g., via WPAN, WLAN, etc. The home gateway/STB then queries the smart phone for the collected digital diary data and receives the digital diary data from the smart phone (step 606) via the established communications link.

The home gateway/STB then communicates with a remote server to deliver at least some of the digital diary data to the remote server (step 608). As described with reference to FIG. 4, the remote server may be a media server or an advertising server. In other embodiments, the remote server may be a server dedicated to collecting and processing digital diary data, which uses the processed digital diary data to select content for one or more smart phones. In response to such delivery, the home gateway/STB receives content from the remote server that is selected based upon to the digital diary data (step 610) and then may download the content to the smart phone upon determining proximity of the smart phone to the home gateway/STB (step 612). The operations 600 of FIG. 6 may be repeated for the smart phone over time, for other smart phones, and for multiple smart phones. Further, some or all of the content may be displayed upon a monitor for the user of the smart phone to view. Moreover, some content may be downloaded to the smart phone and some content may be retained in the home gateway/STB for display on a coupled monitor.

Figure 7:
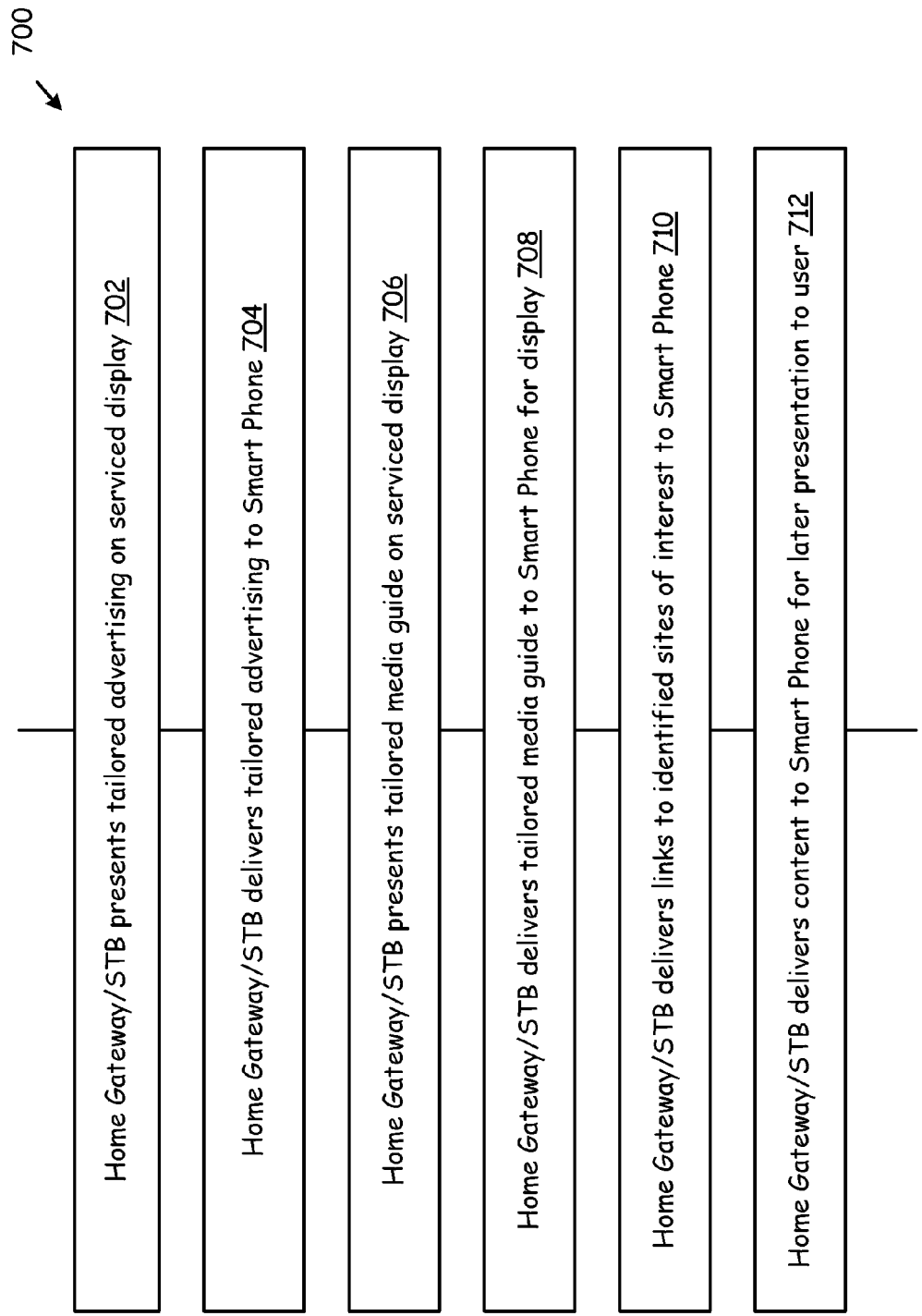
FIG. 7 is a flow chart illustrating operations for delivering various types of content from a home gateway/STB to a smart phone and/or for presenting content on a coupled monitor/sound system according to one or more embodiments of the present invention.

FIG. 7 is a flow chart illustrating operations for delivering various types of content from a home gateway/STB to a smart phone and/or for presenting content on a coupled monitor/sound system according to one or more embodiments of the present invention. These operations include the home gateway/STB presenting tailored advertising that is based upon the digital diary data on a coupled monitor/sound system (step 702) and delivering tailored advertising to the smart phone for presentation on its display (step 704). Such advertising may be presented upon receipt by either device or upon some later event, e.g., time, corresponding other content being presented, location of the smart phone such as its location in a certain geographic area or near a certain business, etc. These operations 700 may also include the home gateway/STB presenting a tailored media guide on a serviced display (step 706) or delivering the tailored media guide to the smart phone for presentation upon the smart phone (step 708). Operations may also include the home gateway/STB delivering links to the smart phone of identified sites of interest to the user of smart phone (step 710) and delivering content to the smart phone for later presentation to the user (step 712).

Figure 8:
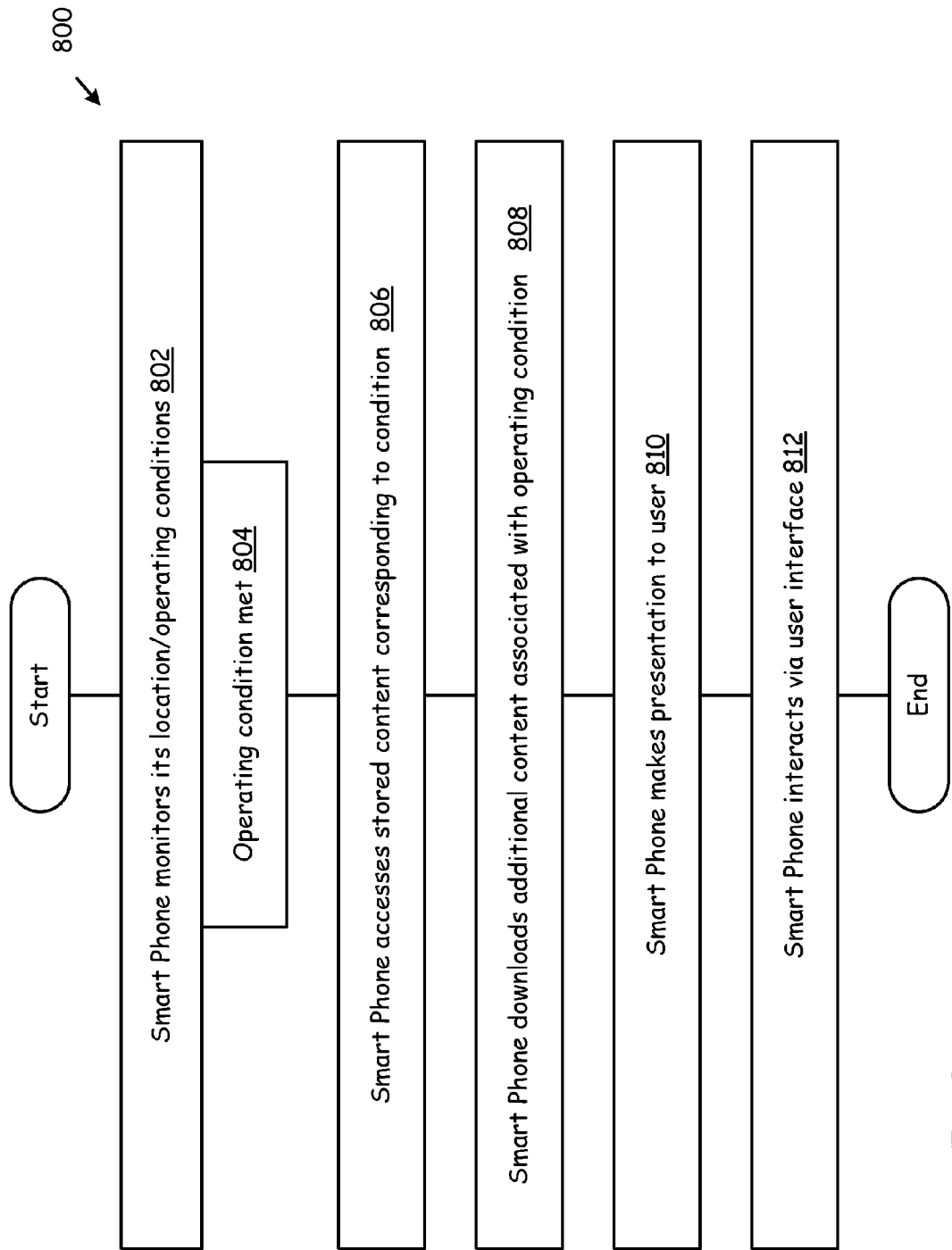
FIG. 8 is a flow chart illustrating operations of a smart phone in presenting content to its user based upon its location system according to one or more embodiments of the present invention.

FIG. 8 is a flow chart illustrating operations of a smart phone in presenting content to its user based upon its location system according to one or more embodiments of the present invention. The operations 800 commence with the smart phone monitoring its location and/or operating conditions (step 802). The location may be a GPS location, availability of particular WLANs, e.g., within a certain store or building. An operating condition may be moving at a certain rate of speed, e.g., walking or stopped to indicate that the user is not driving with his smart phone, the user accessing a particular aspect of its user interface such as browsing for a local restaurant, or the user initiating its media player. When a particular operating condition is met (step 804), the smart phone accesses stored content that corresponds to the met operating condition (step 806). Optionally, the smart phone may download additional content associated with the operating condition (step 808), e.g., relevant advertising content, relevant streamed media, etc. The smart phone then makes presentation of the content to the user via its user interface (step 810). The smart phone then may interact with the user via the user interface (step 812).

Figure 9:
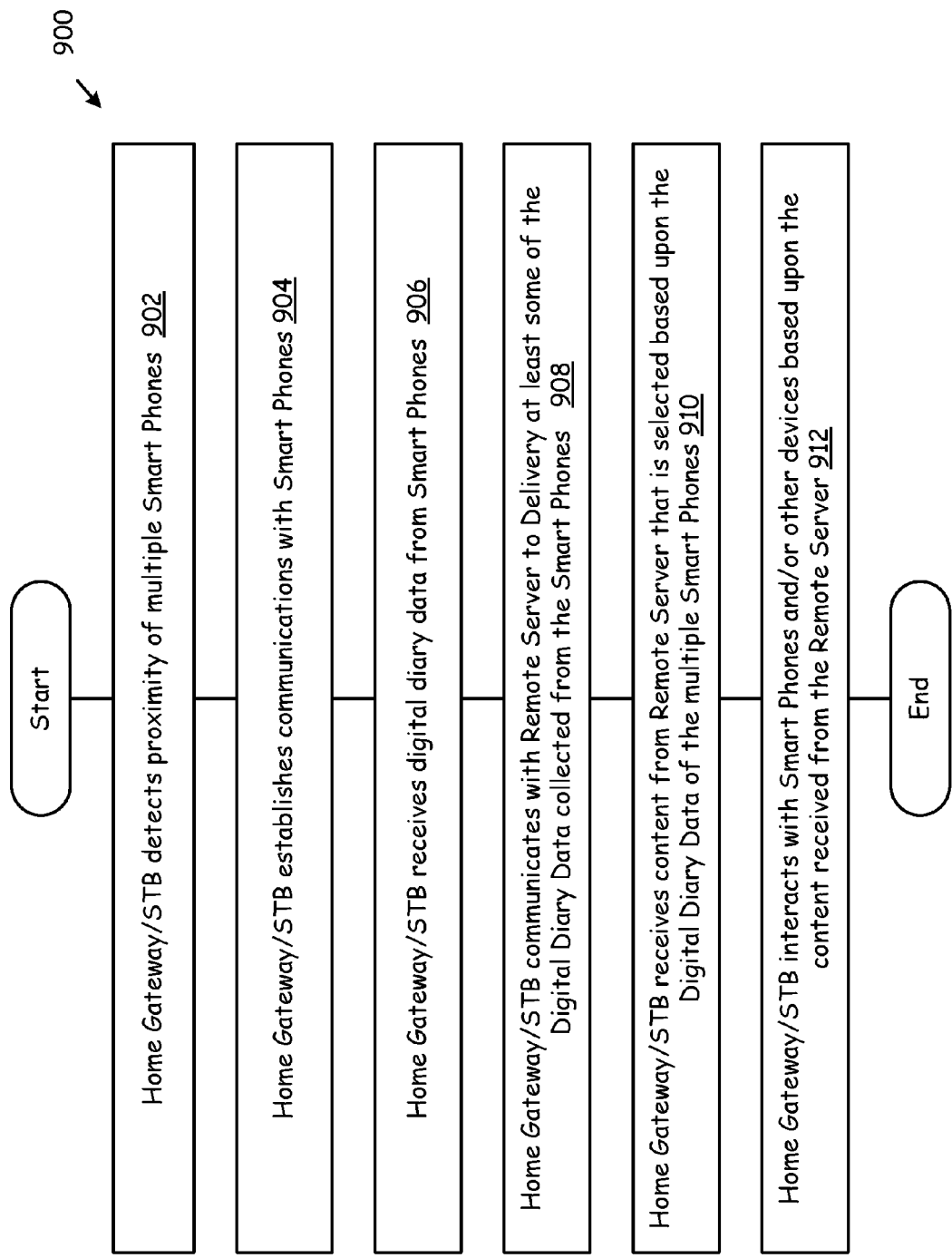
FIG. 9 is a flowchart illustrating operations of a home gateway/STB in servicing multiple smart phones that have collected digital diary data according to one or more embodiments of the present invention.

FIG. 9 is a flowchart illustrating operations of a home gateway/STB in servicing multiple smart phones that have collected digital diary data according to one or more embodiments of the present invention. Operations 900 commence with the home gateway/STB detecting proximity of multiple smart phones that have collected digital diary data (step 902). In one embodiment, the smart phones are registered or paired with the home gateway/STB for the collection of digital diary data and later collection. Operation continues with the home gateway/STB establishing communication with the smart phones (step 904), e.g., via WPAN, WLAN, etc. The home gateway/STB then queries the smart phones for the collected digital diary data and receives the digital diary data from the smart phones (step 906) via the established communications links. The home gateway/STB then communicates with a remote server to deliver at least some of the digital diary data to the remote server (step 908). As described with reference to FIG. 4, the remote server may be a media server or an advertising server. In other embodiments, the remote server may be a server dedicated to collecting and processing digital diary data, which uses the processed digital diary data to select content for one or more smart phones. In response to such delivery, the home gateway/STB receives content from the remote server that is selected based upon to the digital diary data (step 910) and downloads the content to the smarts phone upon determining proximity of the smart phone(s) to the home gateway/STB (step 912).

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a digital diary system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

Aspects of the present invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the present invention have been expressly described herein, other combinations of these features and functions are likewise possible. The present invention is not limited by the particular examples disclosed herein and expressly incorporates these other combinations. Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention.

The invention claimed is:

1. A method for operating a home gateway/STB comprising:
   determining that a smart phone is within a proximity threshold of the home gateway/STB;
   establishing a wireless communication link between the home gateway/STB and the smart phone;
   querying the smart phone for digital diary data via the wireless communication link, the digital diary data including historical data relating to user interactions with the smart phone, the user interactions with the smart phone occurring while the smart phone is outside of communication range of the wireless communication link;

receiving the digital diary data from the smart phone via the wireless communication link;

communicating, via a second communication link, with a remote server to deliver at least some of the digital diary data to the remote server;

receiving content from the remote server, the content selected based upon the historical data of the digital diary data; and displaying the content upon determining proximity of the smart phone to the home gateway/STB.

2. The method of claim 1, wherein displaying the content upon determining proximity of the smart phone to the home gateway/STB comprises at least one of:

downloading the content to the smart phone for presentation upon a display of the smart phone; or displaying the content upon an audio/video system display associated with the home gateway/STB.

3. The method of claim 1, wherein the digital diary data comprises at least one of:

information about at least one transaction serviced by the smart phone; or location data of the smart phone captured over time.

4. The method of claim 1, wherein the content comprises at least one of:

a channel guide that is customized based upon the digital diary data; or media selected based upon the digital diary data.

5. The method of claim 1, wherein the content comprises advertisements selected based upon the digital diary data.

6. The method of claim 5, wherein the advertisements are based upon smart phone location data of the digital diary data, the smart phone location data captured over time.

7. The method of claim 5, wherein the advertisements are delivered, via the wireless communication link, to the smart phone for later presentation to a user of the smart phone.

8. The method of claim 1 further comprising:

querying a second smart phone for second digital diary data, the second digital diary data including historical data relating to user interactions with the second smart phone, the user interactions with the second smart phone occurring while the second smart phone is outside of communication range of the wireless communication link;

receiving the second digital diary data from the second smart phone;

communicating with the remote server to deliver at least some of the second digital diary data; and receiving content from the remote server that is selected based upon both the historical data of the digital diary data and the historical data of second digital diary data.

9. A method for operating a smart phone comprising:

collecting digital diary data based upon usage of the smart phone;

establishing a wireless communication link with a home gateway/STB;

receiving, via the wireless communication link, a query for digital diary data from the home gateway/STB;

retrieving the digital diary data from memory, wherein collecting digital diary data based upon usage of the smart phone occurs while the smart phone is outside range of the wireless communication link;

delivering, via the wireless communication link, at least some of the digital diary data to the home gateway/STB for further delivery to a remote server;

receiving content from the home gateway/STB via the wireless communication link, the content selected by the remote server based upon the digital diary data;

presenting the content on a user interface of the smart phone;

determining that the smart phone is no longer within range of the wireless communication link with the home gateway/STB; and collecting additional digital diary data based upon usage of the smart phone.

10. The method of claim 9, wherein the digital diary data comprises at least one of:

information about at least one transaction serviced by the smart phone; or location data of the smart phone captured over time.

11. The method of claim 9, wherein the content comprises at least one of:

a channel guide that is customized based upon the digital diary data; or media selected based upon the digital diary data.

12. The method of claim 9, wherein the content comprises advertisements selected based upon the digital diary data.

13. The method of claim 12, wherein the advertisements are based upon smart phone location data of the digital diary data, the smart phone location data captured over time.

14. A home gateway/STB comprising:

a wired communications interface;

a wireless communications interface; and processing circuitry coupled to the wireless communications interface, which in combination are configured to:

establish a wireless communication link with a smart phone;

query the smart phone for digital diary data via the wireless communication link;

receive the digital diary data from the smart phone via the wireless communication link, the digital diary data including historical data relating to user interactions with the smart phone, the user interactions with the smart phone occurring while the smart phone is outside of communication range of the wireless communication link;

communicate with a remote server, via the wired communication link, to deliver at least some of the digital diary data to the remote server;

receive content from the remote server, the content selected based upon the historical data of the digital diary data; and display the content upon determining proximity of the smart phone to the home gateway/STB.

15. The home gateway/STB of claim 14, wherein displaying the content upon determining proximity of the smart phone to the home gateway/STB comprises at least one of:

downloading the content to the smart phone via the wireless communication link for presentation upon a display of the smart phone; or displaying the content upon an audio/video system display associated with the home gateway/STB.

16. The home gateway/STB of claim 14, wherein the digital diary data comprises at least one of:

information about at least one transaction serviced by the smart phone; or location data of the smart phone captured over time.

17. The home gateway/STB of claim 14, wherein the content comprises at least one of:

a channel guide that is customized based upon the digital diary data; or media selected based upon the digital diary data.

18. The home gateway/STB of claim 14, wherein the content comprises advertisements selected based upon the digital diary data.

19. The home gateway/STB of claim 18, wherein the advertisements are based upon historical smart phone location data of the digital diary data and delivered to the smart phone for later presentation to a user of the smart phone.

20. The home gateway/STB of claim 14, wherein the processing circuitry and the wireless communications interface are further configured to:
- query a second smart phone for second digital diary data, the second digital diary data including historical data relating to user interactions with the second smart phone, the user interactions with the second smart phone occurring while the second smart phone is outside of communication range of the wireless communication link;
- receive the second digital diary data from the second smart phone;
- communicate with the remote server to deliver at least some of the second digital diary data; and
- receive content from the remote server that is selected based upon both the historical data of the digital diary data and the historical data of the second digital diary data.

* * * * *